United States Patent

[11] 3,631,400

[72] Inventors James T. Dervan, III
Salt Point;
James R. Moysey, La Grangeville, both of N.Y.

[21] Appl. No. 837,570
[22] Filed June 30, 1969
[45] Patented Dec. 28, 1971
[73] Assignee International Business Machines Corporation
Armonk, N.Y.

[54] DATA-PROCESSING SYSTEM HAVING LOGICAL STORAGE DATA REGISTER
5 Claims, 4 Drawing Figs.

[52] U.S. Cl. ........ 340/172.5
[51] Int. Cl. ........ G06f 7/06
[50] Field of Search ........ 340/172.5

[56] References Cited

UNITED STATES PATENTS

| | | | |
|---|---|---|---|
| 3,344,404 | 9/1967 | Curewitz ........ | 340/172.5 |
| 3,056,394 | 10/1962 | Horrell ........ | 235/164 |
| 3,391,394 | 7/1968 | Ottaway et al. ........ | 340/172.5 |
| 3,401,376 | 9/1968 | Barnes et al. ........ | 340/172.5 |

OTHER REFERENCES

IBM- 7094 Data Processing System Reference Manual, Form No. A22- 6703, Oct. 21, 1966

*Primary Examiner*—Gareth D. Shaw
*Assistant Examiner*—Mark Edward Nusbaum
*Attorneys*—Hanfin and Jancin and Douglas R. McKechnie

ABSTRACT: A data-processing system includes a read-only storage data register in which words can be selectively ORed. A read-only storage has its output connected to the register. When the store is cycled to read out a word, the register is either reset prior to being set in accordance with the word or, the reset is inhibited whereby the contents of the word is ORed with a word previously placed in the register. A word may also be placed in the register from an alternate source such as a keyboard or a utilizing system.

INVENTORS
JAMES T. DERVAN III
JAMES R. MOYSEY

BY Douglas R. McKechnie
ATTORNEY

DATA-PROCESSING SYSTEM HAVING LOGICAL STORAGE DATA REGISTER

BACKGROUND OF THE INVENTION

1. Field of the Invention

This invention relates to data-processing systems of the type having a storage data register connected to the output of a storage.

2. Description of the Prior Art

In the prior art, it is common in data-processing systems to provide some form of addressable storage for holding data and control information. The data may be that which is to be processed or it may be something used in the processing of other data. The control information may be used directly to control the setting of gates, switches, etc., or it may be fed to a decoder which in turn controls the processing operation. In order to read information from storage, initiating signals plus an address are applied so as to cause the storage to cycle and provide the addressed word at its outputs, the word being temporarily placed in a data register which makes the information available to the rest of the system. In many storage systems, space is at a premium either because of the high cost of the storage, due to the particular technology in which storage is implemented, or due to the allocation of a limited amount of storage space for a given task.

SUMMARY OF THE INVENTION

The principal object of the invention is to provide a data-processing storage system having a high efficiency in terms of the amount of information to be obtained from a given space in storage.

Another object of the invention is to provide a system whereby words in different locations can be logically combined to produce words whose contents represent new information.

Another object of the invention is to provide a system having a read-only storage with a capability of providing more information than is stored in such storage.

Still another object is to provide a storage system wherein a word read from storage is used to control whether or not the next word to be read will be logically combined with the first word.

Briefly, the manner in which the above objects are obtained is to provide a novel storage data register having a plurality of bistable devices that can be set and reset. During cycling of the read-only storage, the register is initially normally reset and then it is set in accordance with word signals read from storage. One of the signals or word bits read from storage is a control bit that is used to determine whether or not the next word is to be ORed with the first word. If so, during the cycling of the storage for reading out the second word, the normal reset operation is inhibited allowing the second word to be ORed with the contents of the first word. An alternate data source, such as a keyboard, may be used to set information into the register to be used either by itself or in combination with a word already in the register. The principal advantage of such a system is that a high degree of efficiency of the available storage space is achieved by the ability to generate new information from the words already in storage. Another advantage is that by using the storage data register to form the result, performance time is saved in not having to use any separate register or accumulator.

The foregoing and other objects, features and advantages of the invention will be apparent from the following more particular description of the preferred embodiments of the invention, as illustrated in the accompanying drawings.

Figure 1:
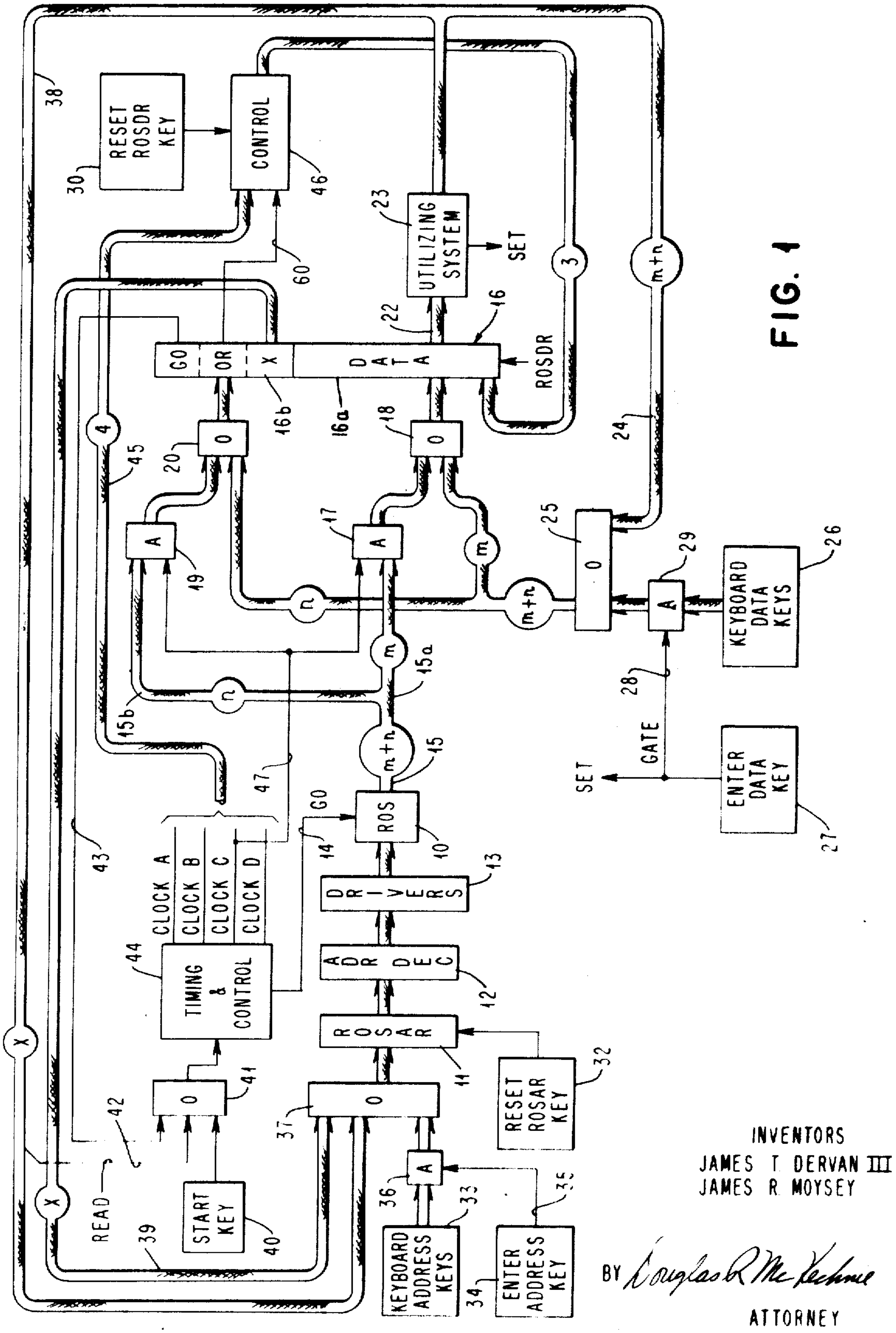
FIG. 1 is a block diagram illustrating a data-processing system embodying the invention.

Referring now to the drawings, the invention is illustrated therein as embodied in a data-processing system having a read-only store (ROS) 10. A specific example of an exemplary store is illustrated in U.S. Pat. No. 3,355,722 Grubb et al. ROS 10 includes a number of addressable locations having information bits stored therein in a semipermanent nature. In such system, the storage address is placed in a read-only store address register (ROSAR) 11. Signals reflecting the address are fed through address decoder circuit 12 to drivers 13 whose output, in conjunction with a read or GO signal on line 14, cycles ROS 10 so as to cause signals representing the word read from the addressed location to be placed on output bus 15.

Bus 15 is connected to a read-only store data register (ROSDR) 16. Within the specific example shown in FIG. 1, each word in ROS 10 consists of $m+n$ bits. Register 16 is divided into two functional registers, a data portion 16*a* which receives *m* bits of data from ROS 10, and a control portion 16*b* which receives *n* bits. The *m* bits of data pass along bus 15*a* to an AND-circuit 17 having its output connected to an OR-circuit 18 which feeds portion 16*a*. Similarly, the *n* bits of data pass long bus 15*b* through AND-circuit 19 and OR-circuit 20 to portion 16*b*. The output of portion 16*a* is connected by bus 22 to a utilizing system 23 so that register 16 constitutes the means by which data in ROS 10 is made available to the system.

Register 16 may also be set by data from utilizing system 23 or from keyboard keys 26. To accomplish this, the bits from utilizing system 23 are gated on to a bus 24, concurrently with a set signal from system 23, the bus being connected through OR-gate 25 to OR-gates 18 and 20 for passing signals representing the data into register 16. Keyboard keys 26 comprise a number of switches that are set in accordance with the data to be entered. After the keys are actuated, an enter data key 27 is actuated which generates a set signal for setting the data in register 16 and a gating signal, on line 28, that passes data from keys 26 through an AND-gate 29 and the OR-gates 25 and 18 and 20, to register 16. A reset ROSDR key 30 provides a suitable signal for resetting register 16 prior to the entry of data from keys 26. This allows such data to either be subsequently ORed with additional data or to be fed directly into utilizing system 23. This arrangement provides a versatile operation in that data can be placed in register 16 from any one of three sources for the purpose of being ORed with the data already therein or with data to be subsequently placed therein.

Additional versatility in this system is derived from the fact that ROS 10 can be addressed and started in accordance with signals derived from a word previously read therefrom, with signals from utilizing system 23, or with signals derived from a keyboard. In the illustrated system, it is assumed that X bits are necessary to define the address of a location in ROS 10. Thus, the keyboard can contain X number of address keys 33 which when set appropriately reflect the address of the location to be read from. Depressing an enter address key 34 causes a gating signal on line 35 to pass the information from keys 33 through an AND-gate 36 and an OR-gate 37 into ROSAR 11. A reset ROSAR key 32 is also provided for resetting ROSAR 11 prior to entry of the next address therein. Utilizing system 23 gates the next address bits on bus 38 to OR-gate 37 into ROSAR 11. When a word is read from ROS 10, it contains a field of X bits which constitute the address of the next word to be read therefrom, and such bits are placed in X field of portion 16*b*. The outputs from such field are connected to a bus 39 which also feeds OR-gate 37 so as to provide the third way for entering addresses in ROSAR 11.

In order to cycle ROS 10, three means are provided which operate in conjunction with the above various ways to address ROS 10. Thus, when an address has been placed from the keyboard into ROSAR 11, depression of a start key 40 transmits a signal through OR-gate 41 to timing and control circuits 44 that provide the GO signal on line 14 for cycling ROS 10.

Alternatively, a read signal on line 42, from the utilizing system 23 will actuate circuits 44 to provide the GO signal. The third way to provide the GO signal is generated from the word from ROS 10. Such word includes a GO bit that is placed in a GO bit latch in **16*b* whose output is connected via line 43 to OR circuit 41. Thus, when the GO latch of register 16*b* is set, a signal appearing on line 43 is effective to generate the GO signal for cycling ROS 10. This arrangement allows ROS 10 to repetitively cycle itself and read out a series of words so long as the appropriate control bits are placed via each word in portion 16*b***.

Timing and control circuits 44 also provide a series of timing pulses designated clock A-D. Clock C pulse is fed via line 47 to gates 17 and 19 to gate at the appropriate time, the data bits from ROS 10. These clock signals are also fed via bus 45 to a control circuit 46. U.S. Pat. No. 3,400,371 which is assigned to the assignee of this application discloses a system utilizing a read-only store and with reference to discussion concerning FIGS. 33 and 34 discloses the matter of generating timing pulses A-D.

Figure 2:
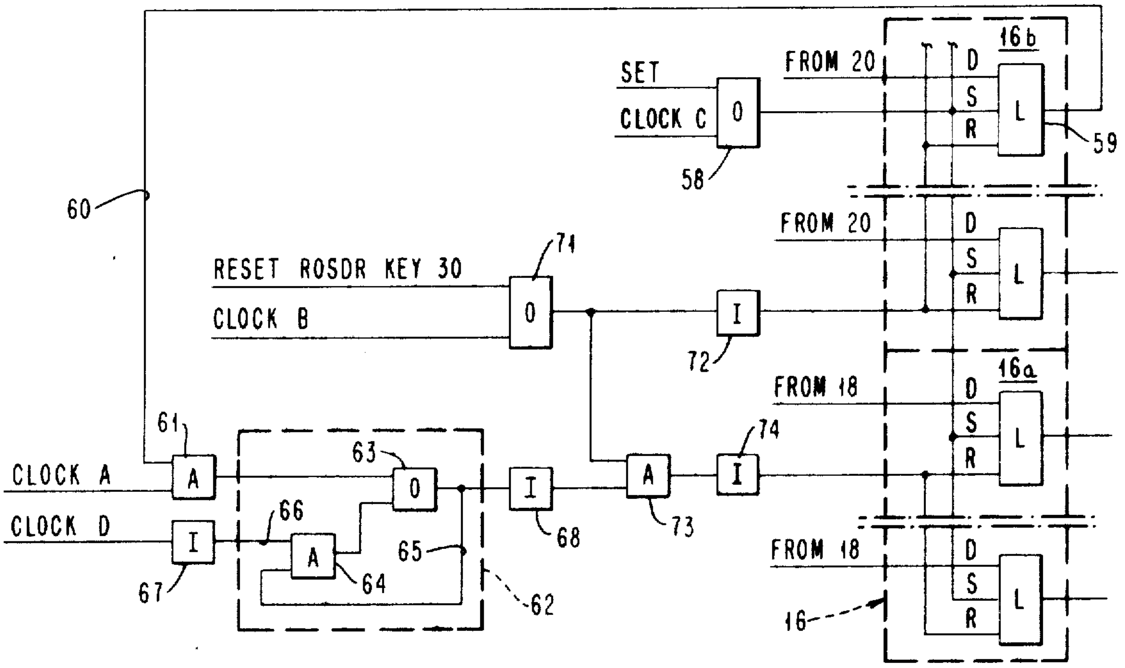
FIG. 2 is a logic diagram of the storage data register and its set and reset controls.
Figure 3:
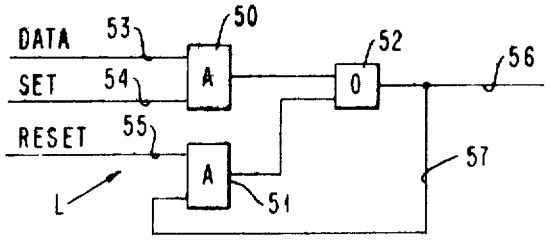
FIG. 3 is a logic diagram of the latch used in the storage data register.

Referring now to FIGS. 2 and 3 showing further details of control 46 of FIG. 1, register 16 comprises a series of latches L providing the logic OR function. As shown in FIG. 3, each latch L has two AND-circuits 50 and 51 and an OR-circuit 52. The logic blocks are implemented in positive logic; positive signals are considered as the active signals and negative signals are the inactive signals. Logic block 50 has two inputs, a data input 53 and a set input 54. AND-circuit 51 has a reset input 55 and a latch back input 57 connected to the output 56 of OR 52. The outputs of AND-circuits 50 and 51 are connected as inputs to OR-circuit 52. Assuming latch L to be initially reset, positive signals on both data and set inputs 53 and 54 cause a positive signal to be fed to the input of OR 52. This in turn, produces a positive output that is fed on line 57 to the input of AND 51. Normally, the voltage on reset input 55 is at a positive level except when it is desired to reset latch L, by means of a negative pulse applied thereto. At the time latch L is set, the positive input on both 55 and 57 causes AND-circuit 51 to provide a positive output. With such positive output, the latch remains in the set state even after the input signals on 53 and 54 become inactive. When it is desired to reset latch L, a negative pulse on line 55 causes the output of 51 to go negative. Such action in turn causes the output of 52 to be negative, indicating the latch is in a reset state.

With reference to FIG. 2, the operation of register 16 is as follows. The set inputs S of all latches L of Reg 16 are connected to the output of an OR-gate 58. This gate is in turn actuated by a clock C signal or by a set signal from either key 27 or system 23. The thus-generated set signal, in conjunction with the data bits from OR-gates 18 and 20 that are fed to the data inputs D of latches L, sets register 16 in accordance with such data bits.

The reset input R of the latches L of portion **16*b* of register 16, are connected to the output of an inverter 72. Its input is connected to the output of an OR-circuit 71 whose inputs are actuated by a clock B signal or by a signal from reset ROSDR key 30. Thus, when either of these signals are present, OR-circuit 71 produces a positive output that, when inverted by inverter 72**, provides the necessary negative input for resetting the latches.

In a somewhat similar manner, the reset inputs R of the latches L of portion **16*a* are connected to the output of an inverter 74 that is actuated by an AND-gate 73. This gate has one input connected, in turn, to the output of OR-gate 71. The other input to AND-gate 73 is connected to the output of an inverter 68, and provides an inhibiting action for preventing resetting of the latches L of 16*a***.

To accomplish the inhibiting function, portion **16*b* includes a latch 59 that when set, provides a signal on line 60 that is fed to an AND-circuit 61. This circuit in turn has a second input that is activated by clock A signal. If latch 59 is set, clock A signal causes an OR memory latch 62 to be set and provide a positive output that is fed to inverter 68 to inhibit resetting the register, in a manner more fully described hereafter. Latch 62 includes an OR-gate 63 connected to the output of AND-circuit 61, and an AND-circuit 64 having one input line 65 connected to the output of OR 63. A second input 66 to AND-circuit 64 is connected to the output of an inverter 67 that is actuated by clock D signal. Thus, when latch 62 is set, the clock D signal activates inverter 67 to provide a negative signal on line 66 for resetting latch 62**.

Figure 4:
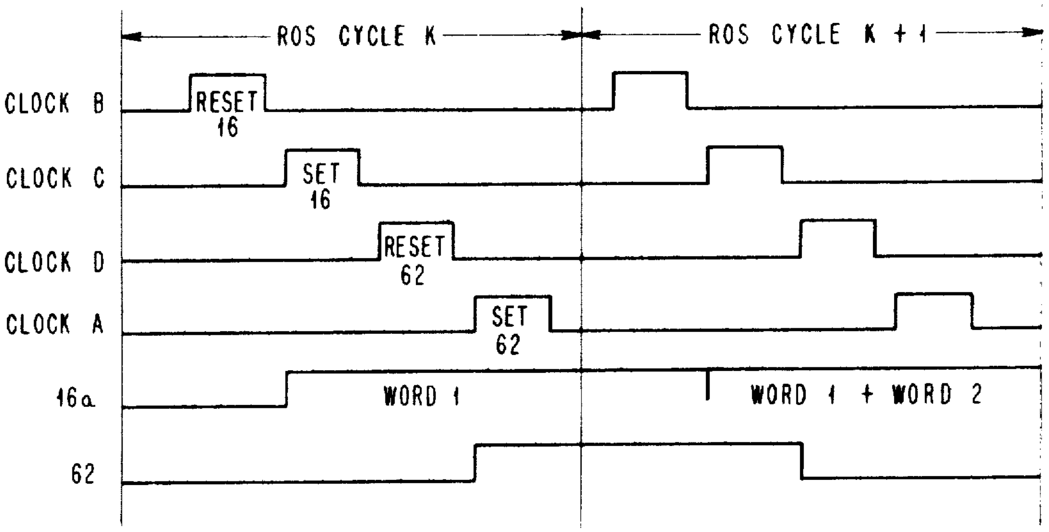
FIG. 4 is a timing diagram illustrating certain principles of operation of the system of FIG. 1.

FIG. 4 illustrates the timing in an example of the operation of a system during read only store cycles K and K+1. In this example, it is assumed that ROS 10 is cycled by signals from either the keyboard or the utilizing system and the operation is one in which a first word is read from ROS 10 and then a second word is read from ROS 10 and placed in register 16 so as to be ORed with the first word. When ROS 10 is cycled by the GO signal on line 14, circuits 44 also provide the clock signals. Clock signal B appears at the beginning of the cycle and is effective to reset register 16 in the manner previously described. When the data appears at the output of ROS 10, clock C signal is synchronized to appear therewith so as to gate the data and set it into register 16. Clock D signal appears after register 16 has been set and is effective to provide a signal for resetting latch 62. In this example, the latch 62 is initially reset so that the reset signal generated by clock D does not produce any action. After clock D signal the clock A signal appears for setting latch 62. In accordance with the example, it is desired to read out the next word so as to be ORed with the first word. Thus, when word 1 is set into portion **16*a*, another bit read from ROS 10 into portion 16*b*, sets latch 59. Latch 59 in conjunction with clock A, sets latch 62 so that when during the next cycle K+1, the clock B signal appears, the clock B signal is effective to reset portion 16*b*, while the signal from latch 62 is effective to inhibit resetting portion 16*a*. Then, during cycle K+1, the clock C signal is effective to set word 2 into portion 16*a* so as to be ORed with word 1, already therein. During this second cycle, the clock signal D resets latch 62. In this example, no further ORing, as controlled by the setting of latch 59**, is done.

While the invention has been particularly shown and described with reference to a preferred embodiment thereof, it will be understood by those skilled in the art that changes in form and details may be made therein without departing from the spirit and scope of the invention.

What is claimed is:

1. In a data-processing system having a store, the improvement comprising:

a data register connected to the output of said store for receiving words therefrom, said register including a plurality of bistable devices settable according to a logic function;

control means operated in synchronism with cycling of said store for providing a first signal for resetting said register and for providing a second signal for setting said register in accordance with a word read from said store;

said control means including means for indicating the need to combine two words from said store in accordance with said logic function;

and selectively actuated means responsive to said means for indicating inhibiting said first signal whereby the setting action of a second word from said store provides a logical combination in said register with a first word that is already stored in said register.

2. The invention of claim 1 wherein:

said selectively actuated means includes a settable and resettable latch, said latch being connected to said control element whereby said latch is set in response to setting said control element.

3. The invention of claim 1 wherein:

said data register includes a control portion having output lines connected to said memory for providing address bits and a memory cycle initiating signal thereto.

4. In a data-processing system, the combination comprising:

a read-only store containing a plurality of addressable locations each containing a word having data bits and a control bit, said store being operative to cycle through a memory cycle in response to a GO signal and address bits, to read out the word at the addressed location;

a read-only store data register coupled to the output of said store for receiving words therefrom, said register including a data portion for receiving said data bits of a words, and a control portion for receiving said control bit, said portions including a plurality of settable and resettable latches, said latches being settable in accordance with the logical OR function;

means connected to said register for applying reset signals thereto in synchronism with a memory cycle;

selectively operated inhibiting means connected to said last-mentioned means for inhibiting the resetting of said data portion whereby the setting action of a plurality of words provides the logical OR combination of said plurality of words in said data portion; and means responsive to a control bit placed in said register for operating said inhibiting means.

5. The invention of claim 4 including:

a second word source connected to said data register for supplying words thereto.

* * * * *